F. H. LEINWEBER, DEC'D.
C. H., W. H. AND V. H. LEINWEBER, EXECUTORS.
AIRSHIP.
APPLICATION FILED MAR. 27, 1917. RENEWED MAR. 13, 1920.

1,386,712.
Patented Aug. 9, 1921.
8 SHEETS—SHEET 2.

INVENTOR.
Frederick H. Leinweber,
BY
his ATTORNEY.

F. H. LEINWEBER, DEC'D.
C. H., W. H. AND V. H. LEINWEBER, EXECUTORS.
AIRSHIP.
APPLICATION FILED MAR. 27, 1917. RENEWED MAR. 13, 1920.

1,386,712.

Patented Aug. 9, 1921.
8 SHEETS—SHEET 8.

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER, EXECUTORS OF SAID FREDERICK H. LEINWEBER, DECEASED.

AIRSHIP.

1,386,712.                              Specification of Letters Patent.     Patented Aug. 9, 1921.

Application filed March 27, 1917. Serial No. 157,622. Renewed March 13, 1920. Serial No. 365,664.

*To all whom it may concern:*

Be it known that I, FREDERICK H. LEINWEBER, a citizen of the United States, and a resident of the city of Chicago, county of Cook, and State of Illinois, have invented certain new and useful Improvements in Airships, of which the following is a specification.

My invention relates to improvements in airships and has for its object the provision of improved means for balancing the same in the air to maintain the ship on an even keel and prevent upsetting of the same.

The invention consists in the combinations and arrangements of parts hereinafter described and claimed.

The invention will be best understood by reference to the accompanying drawings forming a part of this specification, and in which, Figure 1 is a top plan view of a ship embodying my invention, Fig. 2, a side view of the same, Fig. 3, an end view of the same, Fig. 4, an enlarged vertical section taken through the rear portion of the ship, Fig. 5, an enlarged detail partial cross section of the ship, Fig. 6, a detail view of a distributing head employed in the ship, Fig. 7, a detail view of means employed for controlling the feed of fuel to the propeller engines, Fig. 8, another detail view corresponding with Fig. 7, Fig. 9, a plan view illustrating the air connections for controlling the balance of the ship, Fig. 10, an enlarged section corresponding with Fig. 5 but illustrating additional means for controlling the ship's balance, Fig. 11, a detail view of the distributing head or plate employed in the construction, illustrated in Fig. 10, Fig. 12, an enlarged detail view illustrating the different mechanisms for controlling the fuel supply, Fig. 13, a detail view illustrating connections with the fuel supply pipes, Fig. 14, an enlarged section taken on line 14—14 of Fig. 12, Fig. 15, a section taken at right angles to Fig. 14, Fig. 16, a detail view of valve controlling mechanism employed in the construction, and Fig. 17, an enlarged section of a valve employed in the ship.

The form of construction illustrated in Figs. 1 to 9 inclusive, comprises an airship body or car 20 mounted to travel upon wheels 21 and suspended from a plurality of hollow cross arms 22 forming passages by means of hollow hangers 23. Each of the cross arms 22 is preferably provided with a supporting or elevating plane 22', as shown. Each of the cross arms 22 is provided at each end with a cabin 24, adapted to accommodate one or more operators, the hollow arms 22 and hangers 23 giving access to said cabins from the car 20, the parts being made of sufficient size to permit of the passage of men. A hollow adjusting sleeve or shaft 25 is rotatably mounted in the outer wall of each of the cabins 24 and carries a hollow adjusting arm 26 equipped at each end with an explosive engine 27 and a propeller 28, operatively connected therewith. Also arranged in each of the cabins 24 is a mechanism 29 operable manually or automatically through the altitude and arranged to control the positions of propellers 28. The cylinders of the engines 27 are each supplied with fuel through supply pipes 30, 31, 32 and 33, connected with a central distributing head or plate 34 secured to the outer end of the corresponding sleeve 25, and provided on its inner face with annular distributing grooves 35, 36, 37 and 38 connected with the fuel pipes 30, 31, 32 and 33, respectively. Fuel supply pipes 39, 40, 41 and 42 pass through each of the cross arms 22 through a corresponding head 43 in the corresponding sleeve 25 and communicate with annular distributing grooves in said head registering with the grooves 35, 36, 37 and 38 therein, whereby fuel is constantly supplied to the fuel supply pipes 30, 31, 32 and 33, notwithstanding angular adjustments of the cross arms 26. Fuel supply pipes 39, 40, 41 and 42 are supplied with fuel by means of branch pipes 44, 45, 46 and 47, communicating with fuel supply tanks 48, 49, 50 and 51, and whereby fuel is supplied to the various engines 27. So much of the present construction is fully shown and described in my copending application filed November 27th, 1916, Serial No. 133,754, and needs no further description here, it being sufficient to state that the arrangement is such as to control the operative positions of the propellers 28 and supply their driving engines with different kinds of fuel.

The fuel pipes 30, 31, 32 and 33 are equipped with needle valves 52, 53, 54 and 55, respectively, controlling the passage of fuel therethrough. Each of these needle valves carries a worm wheel 56, meshing with a worm 57 on a shaft 58, driven by an air motor 59 supplied with compressed air through supply pipes 60, there being a motor 59 corresponding with each of the engines 27 and propellers 28, as indicated. The air pipes 60 lead to the distributing head or plate 34 which, in this instance, is provided with two pairs of segmental grooves 61, each pair being connected with the corresponding pair of air supply pipes 60, as indicated. The grooves 61 are supplied with compressed air through pipes 62, leading from balance tables 63 and 64 positioned in the rear of the car 20, and supplied with compressed air from air tanks 65, as indicated. The balance table 63 is arranged to be operated by lateral variations in the balance of the ship, and the table 64 by longitudinal variations. The air supply pipes 62, leading from the table 63, lead to the central sets of propellers of the ship and the pipes 62, leading from the table 64, lead to the end propellers of the ship, one thus serving to maintain lateral balance of the ship and the other longitudinal balance thereof. The balance tables 63 and 64 are fully shown and described in the prior patent to Herman Leineweber, granted June 10th, 1913, No. 1,064,232, and are identified with the reference numeral 98 in said patent, being there called an operating board. Two of said balance tables or operating boards are employed in the present construction, the board 63 being arranged to be operated by lateral unbalancing of the ship and the board 64 by longitudinal unbalancing of the ship, each table being also provided, as set forth, with manually operable means for effecting such results. The needle valves 52, 53, 54 and 55 for the various propeller engines are so connected with the corresponding motors 59 that upon lateral unbalancing of the ship, the fuel pipes for the central sets of propellers will be automatically regulated to supply more fuel on the depressed side of the ship and less fuel on the elevated side, thus tending to right the ship. Likewise the parts are so adjusted that upon longitudinal unbalancing of the ship an increased supply of fuel will be supplied to the engines for the propellers at the depressed end of the ship and a decreased supply of fuel supplied to the engines for the propellers at the elevated end of the ship, thus righting the same. These results may also be obtained manually by the manual adjustments provided for tables 63 and 64, as set forth in said patent.

In the form of construction, illustrated in Figs. 10 to 17, inclusive, additional means for preserving the balance of the ship are illustrated. In this arrangement fuel pumping mechanisms 66, 67, 68 and 69 are connected respectively with the fuel supply pipes 39, 40, 41 and 42 to provide a force feed of the fuel to the different propeller engines 27. Each of these fuel feeding or pumping devices comprises a central fuel pump cylinder 70 having air cylinders 71 arranged at each end thereof. A piston 72 operates in each cylinder 70 and pistons 73 operate in the cylinders 71, all of said pistons in each unit being operatively connected by a piston rod 74. Each of the cylinders 70 is provided with an automatically operating intake valve 75 and an outlet valve 76, connected respectively, by means of pipes 77 and 78 with the corresponding fuel feed pipe 39, 40, 41 or 42, as the case may be. A check valve 79 is arranged in each of said fuel pipes between the connections of pipes 77 and 78, thus permitting normal feed of fuel through the pipes and force feed thereof by action of the pumping mechanisms.

Figure 1:
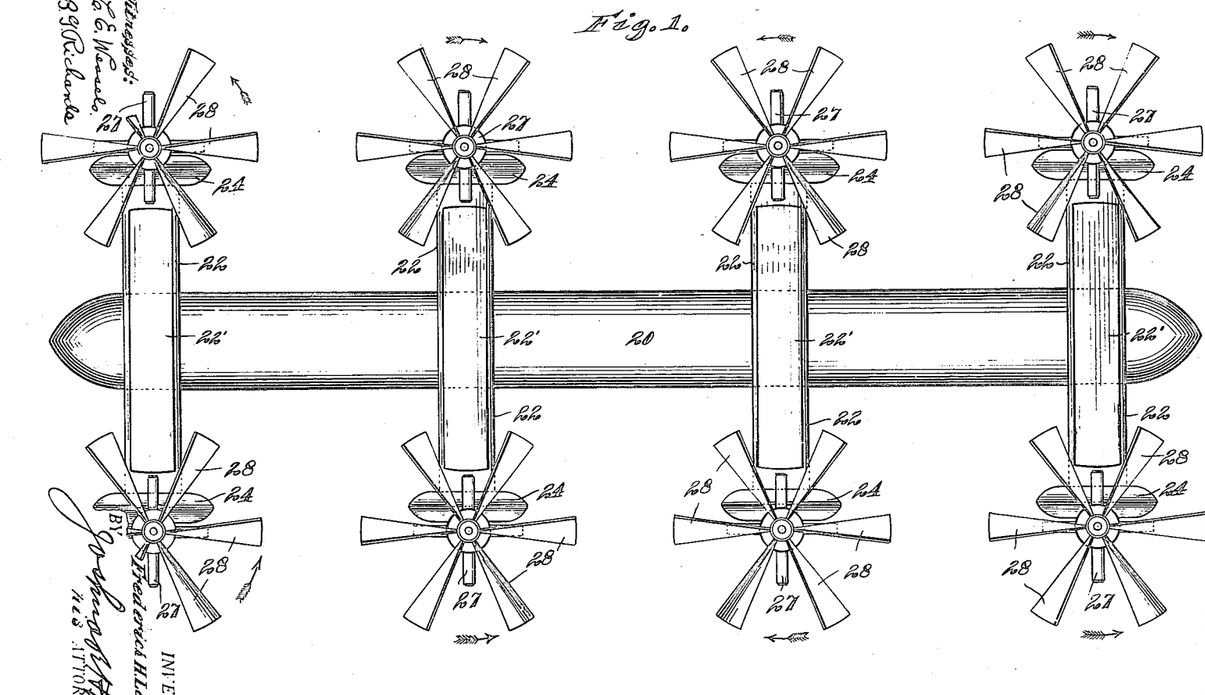
Figure 2:
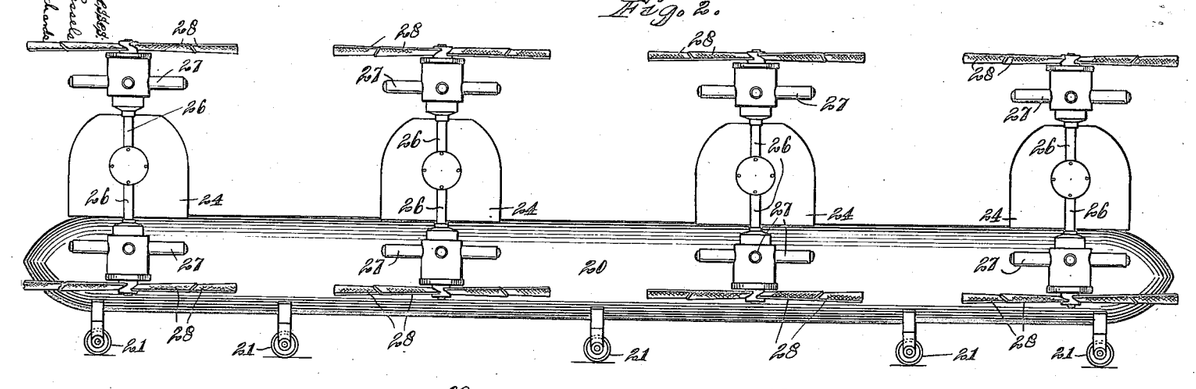
Figure 3:
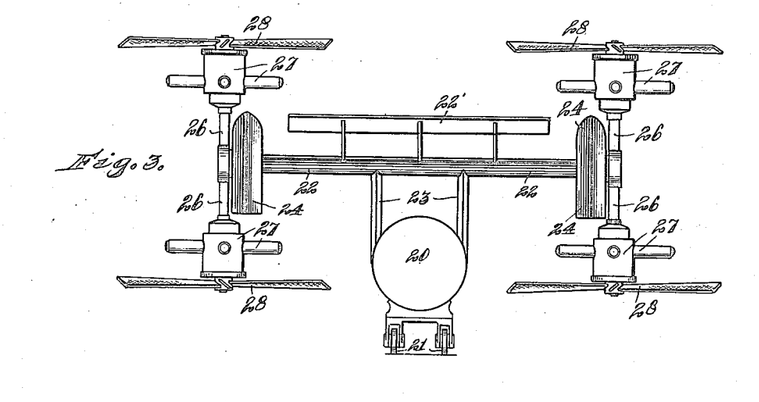
Figure 4:
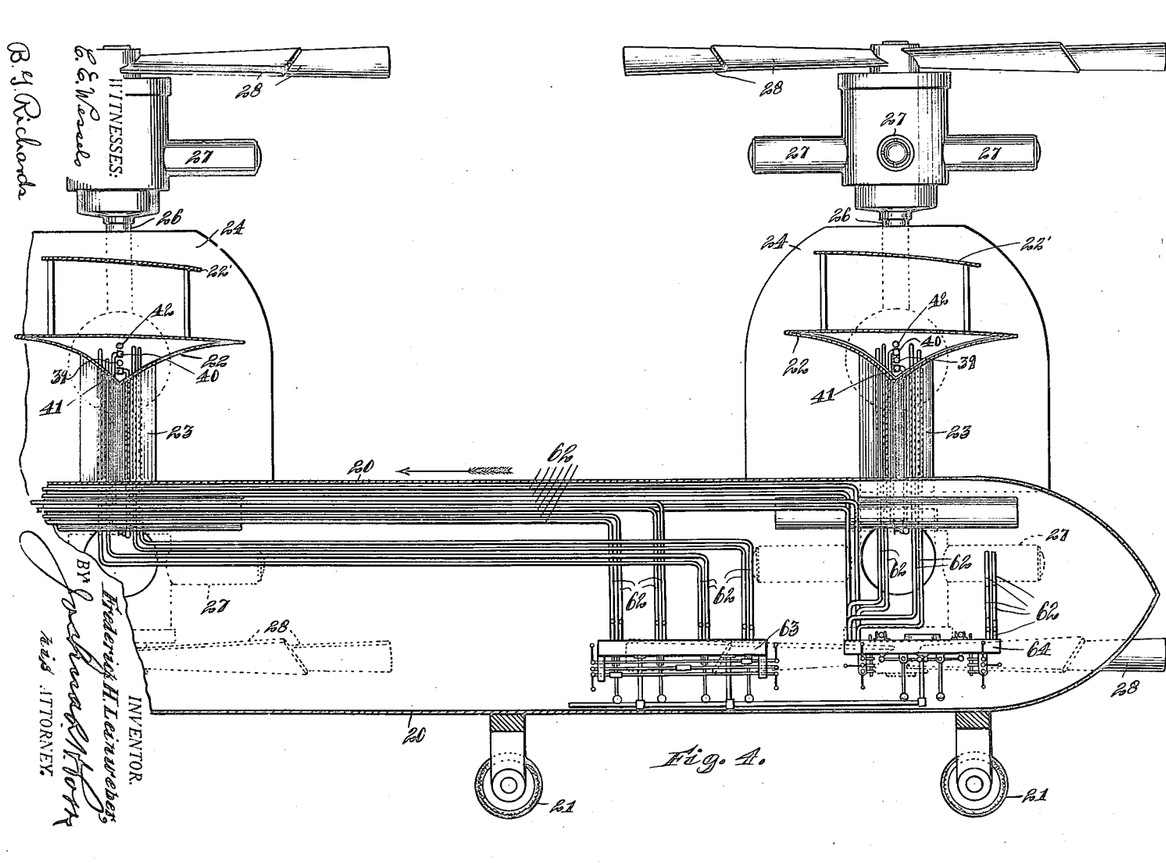
Figures 5, 6:
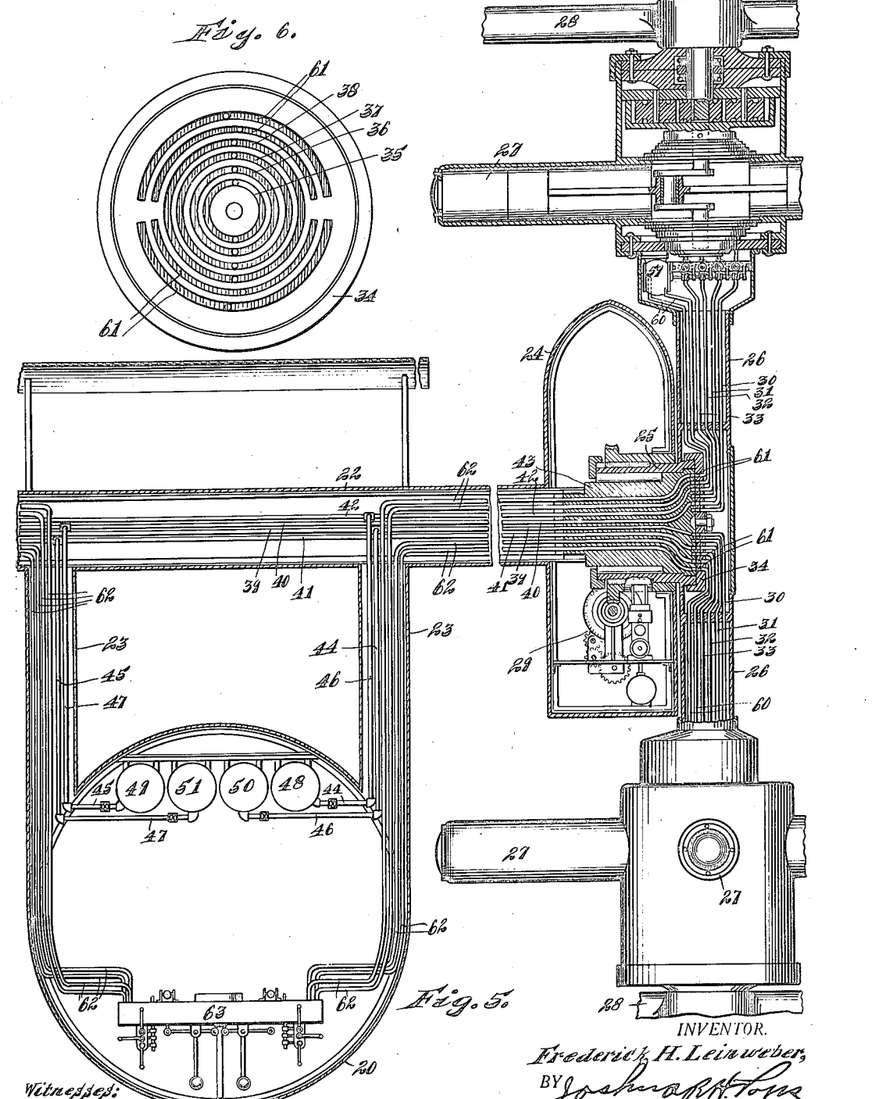
Figures 7, 8, 9:
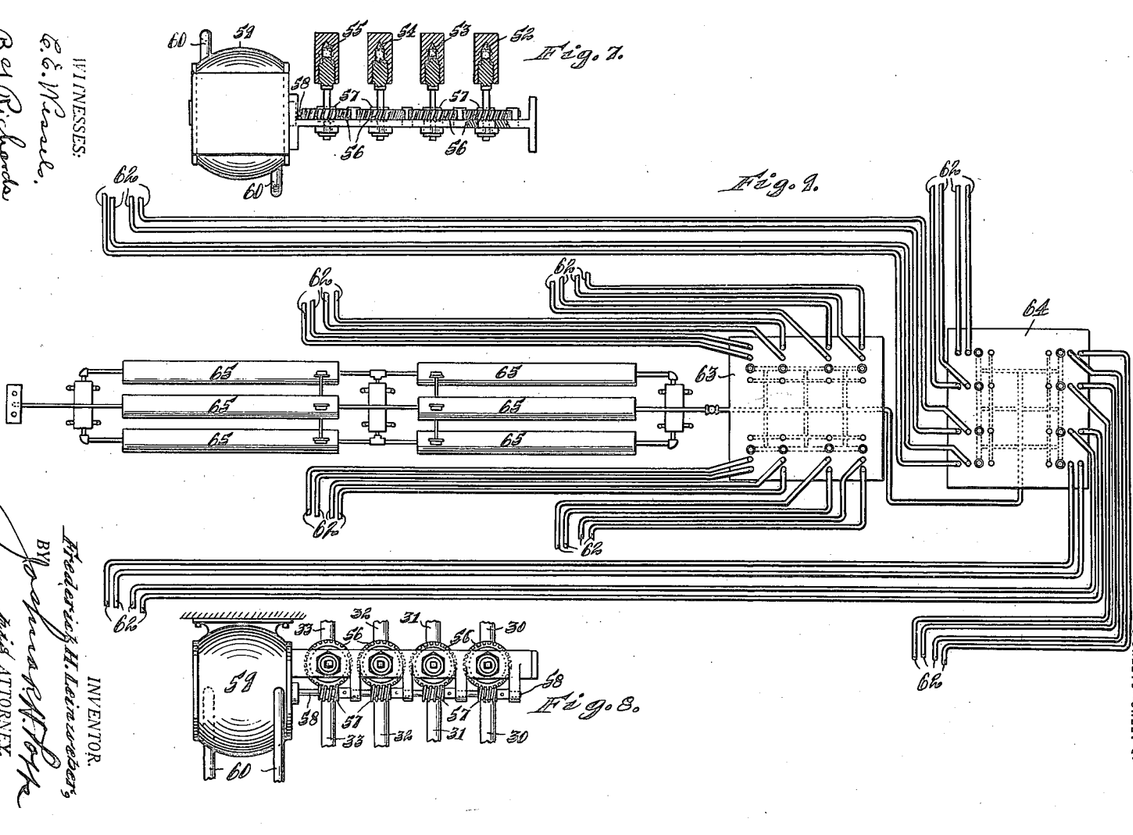
Figures 10, 11:
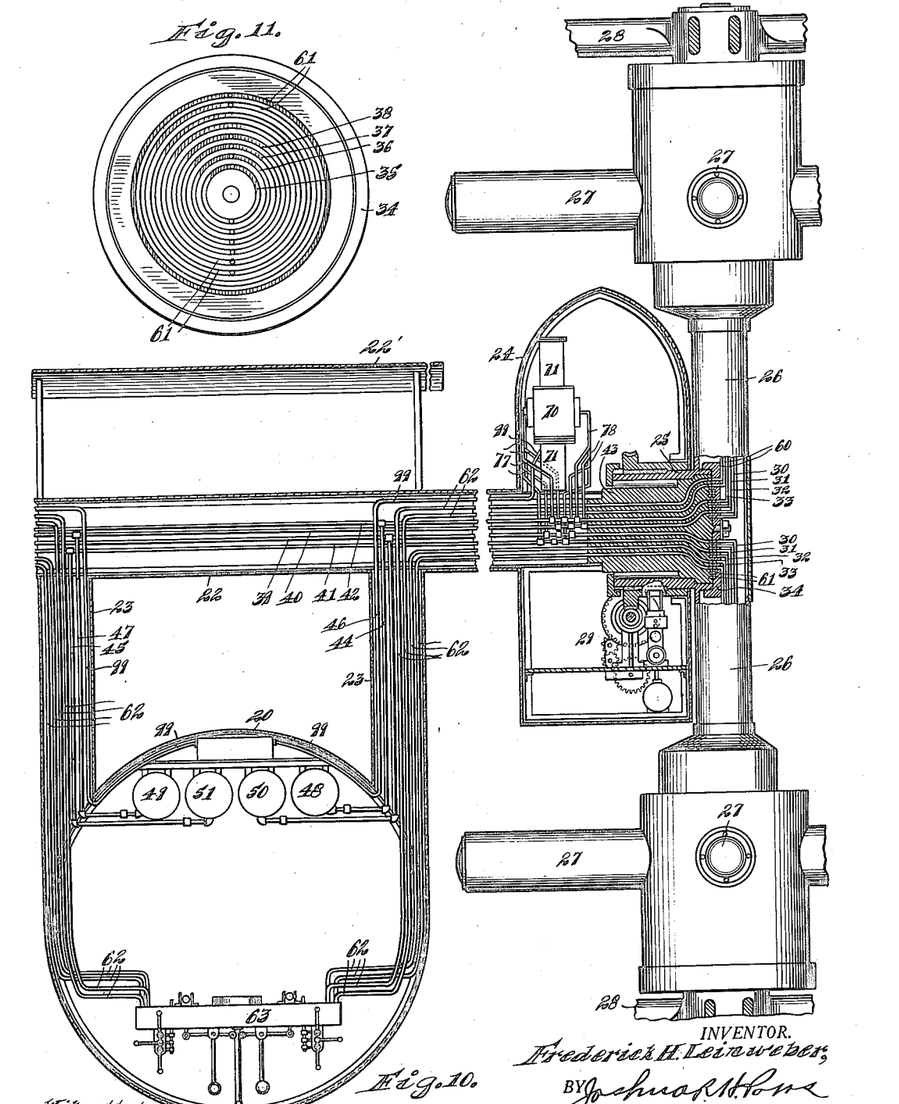
Figure 12:
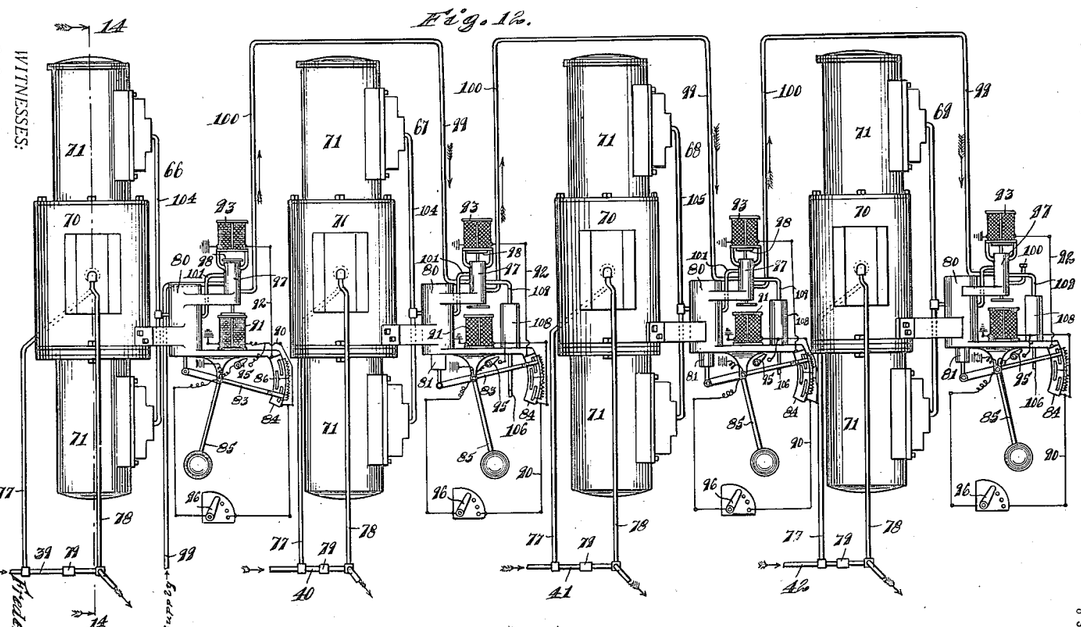
Figure 13:
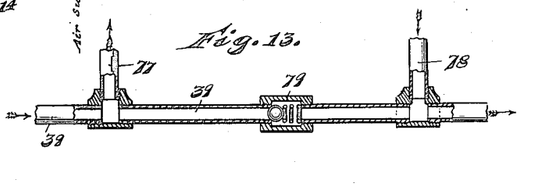
Figure 14:
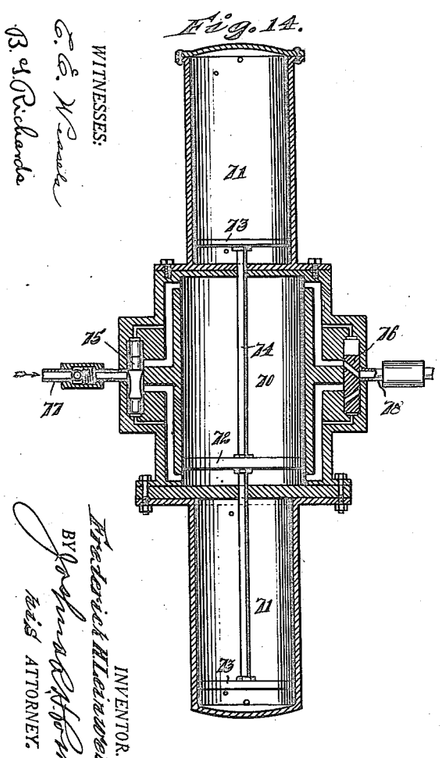
Figure 15:
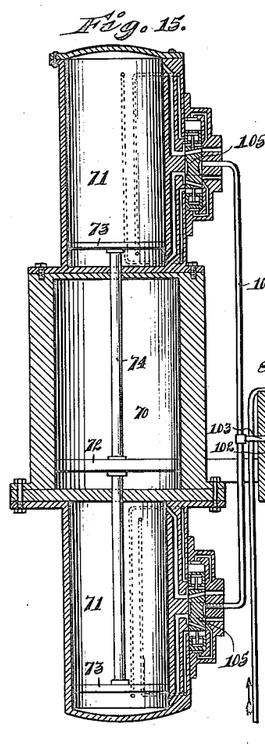

Coöperating with each pumping mechanism is a valve casing 80 having a double cylindrical sliding valve 81 therein, connected with one arm 82 of a controlling lever, the other arm 83 thereof coöperating with an electric resistance member 84. Each of the levers 82—83 is equipped with a depending pendulum 85, normally tending to hold said lever in horizontal position. The resistance member 84 is provided with three contacts 86, 87 and 88, the central contact 86 being connected centrally with a resistance coil 89 and the contacts 87 and 88 being connected, respectively with the ends of said coil. Contact 88 is connected by means of a wire 90 through an electromagnet 91 to a ground and contact 87 is connected by means of a wire 92 through an electromagnet 93 with a ground. Each of the levers 82—83 is operatively connected with a battery 94 or other suitable source of electric current and hand switches 95 and 96 are interposed, as shown, to permit of manual control of the magnets 91 and 93. By this arrangement it will be observed that upon tilting of the ship in one direction or the other, the pendulums 85 will operate, or tend to operate, the corresponding levers 82—83 to excite the respective magnets 91 and 93, the arrangement and the relative strengths of the magnets being such that both magnets are normally excited to some extent, but the upper magnet 93 is somewhat stronger than the magnet 91 so as to overcome the same when the corresponding lever 82—83 is horizontal and the ship is traveling on an even keel. One of the controlling mechanisms, under consideration, is provided for each of said propellers 28, the mechanisms provided for the central sets having their pendulums arranged to swing laterally and thus provide for the end propellers having their pendulums arranged to swing longitudinally.

Figures 16, 17:
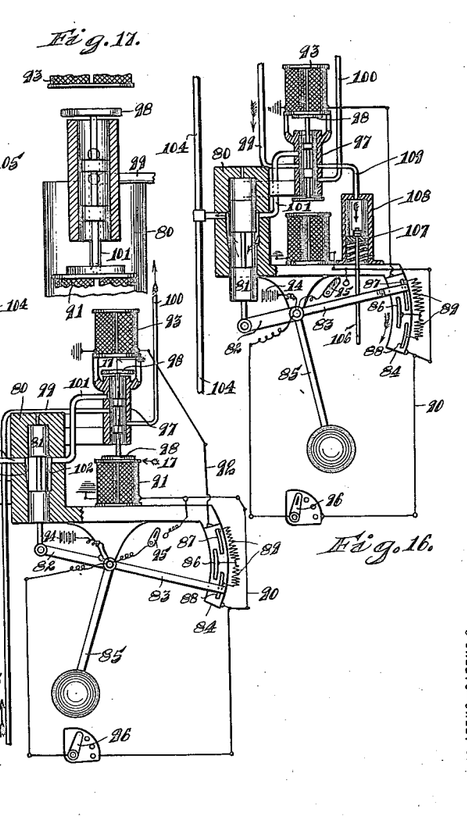

A valve 97 is arranged between the magnets 91 and 93, said valve being arranged to be operated by armatures 98 coöperating with said magnets. Each of the valves 97 is provided with an air supply pipe 99 and an exhaust pipe 100, the arrangement being such that when the strength of magnet 91 is in the ascendency, the corresponding valve is elevated or such exhaust prevented.

Each of the valves 97 is connected by a pipe 101 with the corresponding valve casing 80 communicating with the bleeder passages 102 therein. An air supply pipe 103 leads from each of the valve casings 80 and is connected with corresponding branch pipes 104, leading to automatically operating control valves 105 for the respective air cylinders 71, the arrangement being such that when air, under pressure, is supplied to pipes 104, valves 105 will operate automatically to effect reciprocations of pistons 72, as will be readily understood, thus effecting a force feed of the fuel passing through the respective fuel pipes 39, 40, 41 or 42.

Each of the levers 82—83, corresponding with the pump or feed mechanisms 67, 68 and 69 is equipped with a holding or locking finger 106 operatively connected with a spring held piston 107, operating in a cylinder 108, connected by a pipe 109 with the corresponding casing 97, the arrangement being such that when the corresponding valves in said casings are in their elevated or normal positions, as indicated in Fig. 16, a portion of the air supplied through a corresponding air supply pipe 99 passes to the corresponding cylinder 108 to depress the corresponding finger 106 to release the corresponding pendulum 85 for action under the force of gravity. The arrangement is such that when the ship is traveling on an even keel the pumping mechanism 66 for the pipe 39, operates to effect a force feed of the fuel supplied through said pipe. The different pipes are provided with fuels of successively increasing strengths. For instance, pipe 39 may be supplied with gasolene; pipe 40 with kerosene or some other powerful fuel; pipe 41 with alcohol or some more powerful fuel; and pipe 43 with a still more powerful fuel. In case the ship tips toward the propeller mechanism supplied, the corresponding pendulum for the corresponding pumping mechanism 66, being unfastened, will correspondingly operate to depress the corresponding valve 97. This will cut off the supply of air coming to the apparatus through the corresponding fuel supply pipe 99 and permit of the free passage thereof to the corresponding exhaust pipe 100. The exhaust pipes 100 for each of the valves 97, are connected with the air supply pipes 99 for the mechanisms 67, 68 and 69, so that this action gives access of the air supplied to the next most powerful pumping mechanism, and at the same time supplies air to the corresponding cylinder 108. Should the tipping continue, the corresponding pendulum 85, being thus released, will operate to effect depression of the corresponding valve 97 and thus transfer the air supplied to the next successive pumping mechanism, thus automatically and successively supplying the more powerful fuels in case the tipping continues, thus tending to right the ship and successively increasing the tendency upon continuation of the tipping, so that in case of dangerous tipping more and more powerful agencies are successively and automatically brought into action to correct the same.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with an airship body, of propellers for driving and balancing the same, said propellers being arranged in pairs, the members of each pair being coaxially arranged; means for revolving said propellers about an axis located between them; an engine for operating each propeller; and means for controlling the fuel supply of said engines for balancing the ship, substantially as described.

2. The combination with an airship body, of propellers for driving and balancing the same, said propellers being arranged in pairs, the members of each pair being coaxially arranged; means for revolving said propellers about an axis located between them; an engine for operating each propeller; and automatic means for controlling the fuel supply of said engines for balancing the ship, substantially as described.

3. The combination with an airship body, of propellers for driving and balancing the same, said propellers being arranged in pairs, the members of each pair being coaxially arranged; means for revolving said propellers about an axis located between them; an engine for operating each propeller; and automatic and manual means for controlling the fuel supply of said engines for balancing the ship, substantially as described.

4. The combination with an airship body, of propellers for driving and balancing the same, said propellers being arranged in pairs, the members of each pair being coaxially arranged; means for revolving said propellers about an axis located between them; an engine for operating each propeller; a pendulum for each engine; and means, operable by said pendulums, for controlling the fuel supply of said engines for balancing the ship, substantially as described.

5. The combination with an airship body, of propellers for driving and balancing the same, said propellers being arranged in pairs, the members of each pair being coaxially arranged; means for revolving said propellers about an axis located between them; an engine for operating each propeller; a pendulum for each engine; means, operable by said pendulums, for controlling the fuel supply of said engines for balancing the ship; and manual means for controlling the fuel supply of said engines for balancing the ship, substantially as described.

6. The combination with an airship body, of propellers for driving and balancing the same, said propellers being arranged in pairs, the members of each pair being coaxially arranged; means for revolving said propellers about an axis located between them; an engine for operating each propeller and mounted to revolve therewith; and means for controlling the fuel supply of said engines for balancing the ship, substantially as described.

7. The combination with an airship body, of propellers for driving and balancing the same, said propellers being arranged in pairs, the members of each pair being coaxially arranged; means for revolving said propellers about an axis located between them; an engine for operating each propeller and mounted to revolve therewith; and automatic means for controlling the fuel supply of said engines for balancing the ship, substantially as described.

8. The combination with an airship body, of propellers for driving and balancing the same, said propellers being arranged in pairs, the members of each pair being coaxially arranged; means for revolving said propellers about an axis located between them; an engine for operating each propeller and mounted to revolve therewith; and automatic and manual means for controlling the fuel supply of said engines for balancing the ship, substantially as described.

9. The combination with an airship body, of propellers for driving and balancing the same, said propellers being arranged in pairs, the members of each pair being coaxially arranged; means for revolving said propellers about an axis located between them; an engine for operating each propeller and mounted to revolve therewith; a pendulum for each engine; and means, operable by said pendulums, for controlling the fuel supply of said engines for balancing the ship, substantially as described.

10. The combination with an airship body, of propellers for driving and balancing the same, said propellers being arranged in pairs, the members of each pair being coaxially arranged; means for revolving said propellers about an axis located between them; an engine for operating each propeller and mounted to revolve therewith; a pendulum for each engine; means, operable by said pendulums, for controlling the fuel supply of said engines for balancing the ship; and manual means for controlling the fuel supply of said engines for balancing the ship, substantially as described.

11. The combination with an airship body, of propellers for driving and balancing the same; engines for operating said propellers; means for supplying fuel of different kinds to said engines; and means for controlling the kinds of fuel supplied to said engines for balancing the ship, substantially as described.

12. The combination with an airship body, of propellers for driving and balancing the same; engines for operating said propellers; means for supplying fuel of different kinds to said engines; and automatic means for controlling the kinds of fuel supplied to said engines for balancing the ship, substantially as described.

13. The combination with an airship body, of propellers for driving and balancing the same; engines for operating said propellers; means for supplying fuel of different kinds to said engines; and automatic and manual means for controlling the kinds of fuel supplied to said engines for balancing the ship, substantially as described.

14. The combination with an airship body, of propellers for driving and balancing the same; engines for operating said propellers; means for supplying fuel of different kinds to said engines; a pendulum for each engine; and means, operable by said pendulums, for controlling the kinds of fuel supplied to said engines for balancing the ship, substantially as described.

15. The combination with an airship body, of propellers for driving and balancing the same; engines for operating said propellers; means for supplying fuel of different kinds to said engines; a pendulum for each engine; means, operable by said pendulums, for controlling the kinds of fuel supplied to said engines for balancing the ship; and manual means for controlling the kinds of fuel supplied to said engines for balancing the ship, substantially as described.

16. The combination with an airship body, of propellers for driving and balancing the same; engines for operating said propellers; means for supplying fuel of different kinds to said engines; and means for controlling both the quantities and the kinds of fuel supplied to said engines for balancing the ship, substantially as described.

17. The combination with an airship body, of propellers for driving and balancing the same; engines for operating said propellers; means for supplying fuel of different kinds to said engines; and automatic means for controlling both the quantities and the kinds of fuel supplied to said engines for balancing the ship, substantially as described.

18. The combination with an airship body, of propellers for driving and balancing the same; engines for operating said propellers; means for supplying fuel of different kinds to said engines; and automatic and manual means for controlling both the quantities and the kinds of fuel supplied to said engines for balancing the ship, substantially as described.

19. The combination with an airship body, of propellers for driving and balancing the same; engines for operating said propellers; means for supplying fuel of different kinds to said engines; a pendulum for each engine; and means, operable by said pendulums, for controlling both the quantities and the kinds of fuel supplied to said engines for balancing the ship, substantially as described.

20. The combination with an airship body, of propellers for driving and balancing the same; engines for operating said propellers; means for supplying fuel of different kinds to said engines; a pendulum for each engine; means, operable by said pendulums, for controlling both the quantities and the kinds of fuel supplied to said engines for balancing the ship; and manual means for controlling the kinds of fuel supplied to said engines for balancing the ship, substantially as described.

21. The combination with an airship body, of propellers for driving and balancing the same, said propellers being arranged in pairs, means for changing the angularity of each of said pairs with the horizontal, including a rotatable arm carrying a propeller at each of its opposite ends, an engine for operating each propeller, and means for controlling the fuel supply of said engines for balancing the ship, substantially as described.

22. The combination with an airship body, of propellers for driving and balancing the same, said propellers being arranged in pairs, means for changing the angularity of each of said pairs with the horizontal, an engine for operating each propeller, a pendulum for each engine, and means operable by said pendulums for controlling the fuel supply of said engines for balancing the ship, substantially as described.

23. The combination with an airship body, of propellers for driving and balancing the same, said propellers being arranged in pairs, means for changing the angularity of each of said pairs with the horizontal, an engine for operating each propeller, and mounted to revolve therewith, and means for controlling the fuel supply of said engines for balancing the ship, substantially as described.

24. The combination with an airship body, an arm carrying a propeller at each end, said arm being mounted to rotate about a transverse axis, means for rotating said arm to change the angularity of each of said propellers with the horizontal, an engine for operating each propeller, a pendulum for each engine, and means operable by said pendulums for controlling the fuel supply of said engines for balancing the ship.

In testimony whereof I have signed my name to this specification in the presence of two subscribing witnesses.

FREDERICK H. LEINWEBER.

Witnesses:
 JOSHUA R. H. POTTS,
 HELEN F. LILLIS.